United States Patent
Lee et al.

(10) Patent No.: US 9,980,121 B2
(45) Date of Patent: May 22, 2018

(54) METHOD AND APPARATUS FOR PERFORMING DISCOVERY IN WIRELESS COMMUNICATION SYSTEM

(71) Applicant: LG ELECTRONICS INC., Seoul (KR)

(72) Inventors: Byungjoo Lee, Seoul (KR); Giwon Park, Seoul (KR); Dongcheol Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/111,759

(22) PCT Filed: Aug. 18, 2014

(86) PCT No.: PCT/KR2014/007623
§ 371 (c)(1),
(2) Date: Jul. 14, 2016

(87) PCT Pub. No.: WO2015/111811
PCT Pub. Date: Jul. 30, 2015

(65) Prior Publication Data
US 2016/0337838 A1    Nov. 17, 2016

Related U.S. Application Data

(60) Provisional application No. 61/931,669, filed on Jan. 26, 2014, provisional application No. 61/934,855, (Continued)

(51) Int. Cl.
*H04W 8/00*       (2009.01)
*H04W 48/14*     (2009.01)
(Continued)

(52) U.S. Cl.
CPC ........... *H04W 8/005* (2013.01); *H04W 48/14* (2013.01); *H04W 72/0413* (2013.01); *H04W 84/12* (2013.01)

(58) Field of Classification Search
CPC .. H04W 72/0413; H04W 84/12; H04W 48/14
See application file for complete search history.

(56) References Cited

U.S. PATENT DOCUMENTS

2011/0149806 A1*  6/2011  Verma ................. H04L 12/2809
                                                                    370/255
2012/0243524 A1    9/2012  Verma et al.
(Continued)

FOREIGN PATENT DOCUMENTS

KR   10-2011-0073239   6/2011
KR   10-2012-0073150   7/2012
(Continued)

OTHER PUBLICATIONS

PCT International Application No. PCT/KR2014/007623, Written Opinion of the International Searching Authority dated Nov. 21, 2014, 16 pages.
(Continued)

*Primary Examiner* — David Oveissi
(74) *Attorney, Agent, or Firm* — Lee, Hong, Degerman, Kang & Waimey

(57) ABSTRACT

One embodiment for the present invention related to a method for performing discovery by a first device supporting Wi-Fi display (WFD), the method comprising: transmitting a discovery request frame containing one or more type length value (TLV) fields to an access point (AP); and receiving, through an AP, a discovery response frame which is transmitted from a second device having received the discovery request frame and which contains one or more TLV fields, wherein the one or more TLVs included in the discovery request frame contains information on the first (Continued)

(a)

(b)

device, and the one or more TLVs included in the discovery response frame contains, among information on the second device, information corresponding to the discovery request frame.

16 Claims, 10 Drawing Sheets

Related U.S. Application Data filed on Feb. 3, 2014, provisional application No. 61/946,866, filed on Mar. 2, 2014.

(51) Int. Cl.
*H04W 72/04* (2009.01)
*H04W 84/12* (2009.01)

(56) References Cited

U.S. PATENT DOCUMENTS

| | | | |
|---|---|---|---|
| 2013/0166759 | A1 | 6/2013 | Rajamani et al. |
| 2013/0185447 | A1* | 7/2013 | Nagawade ............ H04W 8/005 709/228 |
| 2014/0254569 | A1* | 9/2014 | Abraham ............. H04L 5/0092 370/336 |

FOREIGN PATENT DOCUMENTS

| KR | 10-2012-0103567 | 9/2012 |
|---|---|---|
| KR | 10-2013-0103684 | 9/2013 |

OTHER PUBLICATIONS

Korean Intellectual Property Office Application No. 10-2016-7017231, Notice of Allowance dated Dec. 14, 2017, 2 pages.

\* cited by examiner

FIG. 8

| IP header | UDP header | UDP datagram |
|---|---|---|

| Field | Size (octets) | Value | Description |
|---|---|---|---|
| Opcode | 1 | Variable | Opcode for each message are listed below table. |
| Sequence number | 1 | 0-255 | Sequence number is incremented by 1, when the device sends a new message. |
| Payload | Variable | Variable | Each message type defines a payload format. |

(a)

| Opcode | Message |
|---|---|
| 0 - 6 | Using in WFDS |
| 7-249 | Reserved |
| 250 | SESSION_INIT_REQUEST |
| 251 | SESSION_INIT_RESPONSE |
| 252 | DISCOVERY_REQUEST |
| 253 | DISCOVERY_RESPONSE |
| 254 | ACK |
| 255 | NACK |

(b)

| Opcode (Value) | Packet Type |
|---|---|
| 0 | WFD Discovery Request |
| 1 | WFD Discovery Response |
| 2 | WFD RTSP Start Request |
| 3 | WFD RTSP Start Response |
| 4-254 | Reserved |

(c)

FIG. 9
| Field | Size (octets) | Value | Description |
|---|---|---|---|
| Opcode | 1 | 252 | DISCOVERY_REQUEST message |
| Sequence number | 1 | Variable | |
| Version | 1 | Variable | Protocol version information |
| Length | 2 | Variable | Length of Information Element TLVs |
| IE TLVs | Variable | Variable | Multiple TLVs |
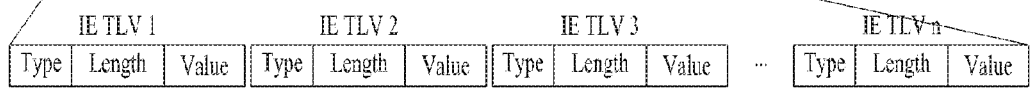
(a)
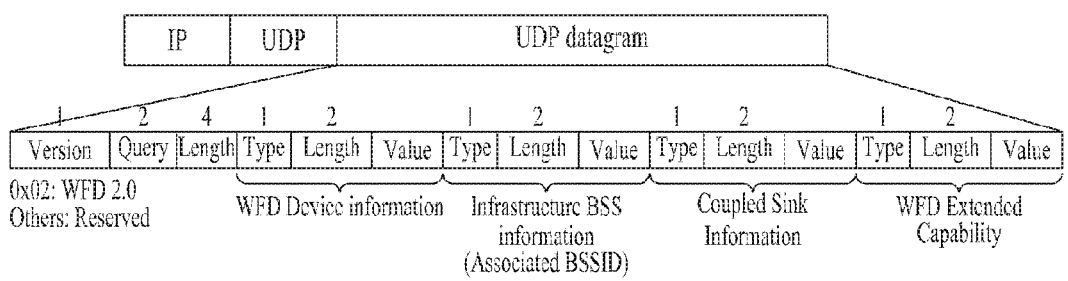
(b)

FIG. 10
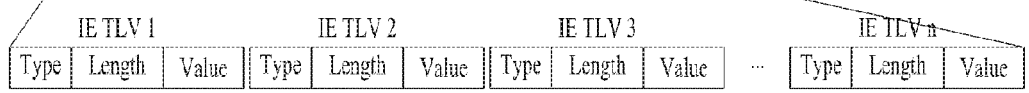
(a)
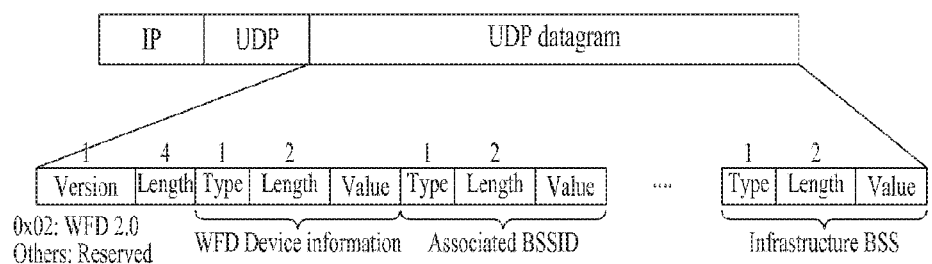
(b)

METHOD AND APPARATUS FOR PERFORMING DISCOVERY IN WIRELESS COMMUNICATION SYSTEM

CROSS-REFERENCE TO RELATED APPLICATIONS

This application is the National Stage filing under 35 U.S.C. 371 of International Application No. PCT/KR2014/007623, filed on Aug. 18, 2014, which claims the benefit of U.S. Provisional Application No. 61/931,669, filed on Jan. 26, 2014, 61/934,855, filed on Feb. 3, 2014 and 61/946,866, filed on Mar. 2, 2014, the contents of which are all hereby incorporated by reference herein in their entirety.

TECHNICAL FIELD

Following description relates to a wireless communication system, and more particularly, to a method of performing discovery in Wi-Fi direct display and an apparatus therefor.

BACKGROUND ART

Along with the recent development of information and communication technology, various wireless communication technologies have been developed. Among them, Wireless Local Area Network (WLAN) enables wireless access to the Internet based on radio frequency technology through a portable terminal such as a Personal Digital Assistant (PDA), a laptop computer, a Portable Multimedia Player (PMP) in a home, an office, or a specific service providing area.

The introduction of Wi-Fi Direct or Wi-Fi Peer-to-Peer (Wi-Fi P2P) is under discussion, as a direct communication technology that facilitates interconnection between devices without a wireless Access Point (AP) which is a basic requirement for a legacy WLAN system. According to Wi-Fi Direct, devices can be connected to each other without a complex establishment procedure and an operation for exchanging data at a communication rate offered by a general WLAN system can be supported to provide various services to users.

Recently, various Wi-Fi-enabled devices have been used. Among them, the number of Wi-Fi Direct-enabled devices which are Wi-Fi devices capable of communicating with each other without an AP is increasing. The Wi-Fi Alliance (WFA) has been discussing the introduction of a platform supporting various services (e.g., Send, Play, Display, Print, etc.) using a Wi-Fi Direct link. This may be referred to as Wi-Fi Direct Service (WFDS). According to WFDS, applications, services, etc. can be controlled or managed by a service platform called Application Service Platform (ASP).

A standard on a wireless LAN (WLAN) technology is developing in IEEE (Institute of Electrical and Electronic Engineers) 802.11 group. IEEE 802.11a and b use an unlicensed band in 2.4 GHz or 5 GHz and IEEE 802.11b provides transmission speed of 11 Mbps, and IEEE 802.11a provides transmission speed of 54 Mbps. IEEE 802.11g provides transmission speed of 54 Mbps by applying OFDM (Orthogonal Frequency Division Multiplexing) in 2.4 GHz. IEEE 802.11n provides transmission speed of 300 Mbps by applying MIMO-OFDM (Multiple Input Multiple Output-OFDM). IEEE 802.11n supports a channel bandwidth up to 40 MHz. In this case, IEEE 802.11n can provide transmission speed of 600 Mbps.

In WLAN environment according to IEEE 802.11e, a DLS (Direct Link Setup)-related protocol assumes that a BSS (Basic Service Set) corresponds to a QBSS (Quality BSS) supporting a QoS (Quality of Service). In the QBSS, not only a non-AP STA but also an AP corresponds to a QAP (Quality AP) that supports QoS. Yet, in a currently commercialized WLAN environment (e.g., WLAN environment according to IEEE 802.11a/b/g), although a non-AP STA corresponds to a QSTA (Quality STA) supporting QoS, most of APs correspond to a legacy AP incapable of supporting QoS. As a result, even a QSTA has a limit on using a DLS service in the currently commercialized WLAN environment.

A TDLS (Tunneled Direct Link Setup) corresponds to a wireless communication protocol newly proposed to overcome the aforementioned limit. Although the TDLS does not support QoS, the TDLS can make QSTAs establish a direct link in the currently commercialized WLAN environment such as IEE 802.11a/b/g and enable a direct link to be established in a PSM (power save mode). Hence, the TDLS regulates various procedures to make QSTAs establish a direct link in a BSS managed by a legacy AP as well. In the following, a wireless network supporting the TDLS is referred to as a TDLS wireless network.

A legacy wireless LAN mainly handles an operation of an infra structure BSS in which a wireless access point (AP) functions as a hub. An AP is in charge of a function of supporting a physical layer for establishing a wired/wireless connection, a function of routing devices in a network, a function of providing a service for adding/deleting a device to/from a network, and the like. In this case, the devices in the network are connected with each other via the AP and the devices are not directly connected with each other.

As a technology of supporting a direct connection between devices, discussion on establishing a standard for Wi-Fi Direct is in progress.

A Wi-Fi direct network corresponds to a network that Wi-Fi devices are able to perform D2D (Device to Device) (or P2P (Peer-to-Peer)) communication with each other although the Wi-Fi devices do not participate in a home network, an office network, and a hotspot network. The Wi-Fi direct network has been proposed by Wi-Fi Alliance. In the following, Wi-Fi Direct-based communication is referred to as Wi-Fi D2D communication (simply, D2D communication) or Wi-Fi P2P communication (simply, P2P communication). And, a device for performing the Wi-Fi P2P is referred to as a Wi-Fi P2P device, simply, a P2P device.

A WFDS network can include one or more Wi-Fi devices. A WFDS device includes devices supporting Wi-Fi such as a display device, a printer, a digital camera, a projector, a smartphone, and the like. And, the WFDS device includes a non-AP STA and an AP STA. WFDS devices belonging to a WFDS network can be directly connected with each other. Specifically, P2P communication may indicate a case that a signal transmission path between two WFDS devices is directly configured between the WFDS devices without passing through the third device (e.g., an AP) or a legacy network (e.g., accessing WLAN via an AP). In this case, the signal transmission path directly configured between the two WFDS devices can be restricted to a data transmission path. For example, the P2P communication may indicate a case that a plurality of non-STAs transmit data (e.g., voice/image/text message information, etc.) without passing through an AP. A signal transmission path for control information (e.g., resource allocation information for P2P configuration, wireless device identification information, etc.) can be directly configured between WFDS devices (e.g., between a non-AP STA and a non-AP STA, between a non-AP STA and an AP), can be configured between two devices (e.g., between a non-AP STA and a non-AP STA) via an AP, or can be configured between an AP and a corresponding WFDS device (e.g., between an AP and a non-AP STA #1, between an AP and a non-AP STA #2).

Wi-Fi Direct corresponds to a network connection standard technology for defining up to an operation of a link layer. Since a standard on an application, which is operating in a higher layer of a link configured by the Wi-Fi Direct, is not defined, when an application is executed after devices supporting the Wi-Fi Direct are connected with each other, it was difficult to support compatibility. In order to solve the aforementioned problem, discussion on standardizing such a higher layer application as a Wi-Fi direct service (WFDS) is in progress in Wi-Fi Alliance (WFA).

FIG. 1 illustrates components of a WFDS (Wi-Fi Direct Service) framework.

Referring to FIG. 3, a Wi-Fi Direct layer is a MAC (Medium Access Control) layer defined by the Wi-Fi Direct standard. The Wi-Fi Direct layer may include software compatible with the Wi-Fi Direct standard. A wireless connection may be configured by a PHY layer (not shown) compatible with the Wi-Fi PHY layer, under the Wi-Fi Direct layer. A platform called Application Service Platform (APS) is defined above the Wi-Fi Direct layer.

The ASP is a common shared platform and performs session management, service command processing, and control and security between ASPs between its overlying Application layer and its underlying Wi-Fi Direct layer.

A Service layer is defined above the ASP. The Service layer includes use case-specific services. The WFA defines four basic services, Send, Play, Display, and Print. Also, an Enable Application Program Interface (API) is defined to use an ASP common platform when a third party application other than the basic services is supported.

While Send, Play, Display, Print, or services defined by third party applications are shown in FIG. 1 as exemplary services, the scope of the present invention is not limited thereto. For example, the term "service" may mean any of services supporting Wi-Fi Serial Bus (WSB), Wi-Fi Docking, or Neighbor Awareness Networking (NAN), in addition to Send, Play, Display, Print, or the services defined by the third party applications.

Send is a service and application that can perform file transfer between two WFDS devices. Play is a service and application that enable sharing or streaming of Digital Living Network Alliance (DLNS)-based Audio/Video (A/V), photos, music, etc. between two WFDS devices. Print is a service and application that enable output of text and photos between a device having content such as text, photos, etc. and a printer. Display is a service and application that enable screen sharing between a Miracast source and a Miracast sink of the WFA.

The Application layer may provide a User Interface (UI), represent information as a human-perceivable form, and provide a user input to a lower layer.

DISCLOSURE OF THE INVENTION

Technical Task

A technical task of the present invention is to provide methods for a device including an internet protocol connection to perform discovery.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to a first technical aspect, a method of performing discovery, which is performed by a first device supporting WFD (Wi-Fi Display), includes the steps of transmitting a discovery request frame including one or more TLV (type length value) fields to an AP (access point) and receiving a discovery response frame, which is received from a second device received the discovery request frame, including one or more TLV fields via the AP. In this case, the one or more TLV fields included in the discovery request frame includes information on the first device and the one or more TLV fields included in the discovery response frame includes information corresponding to the discovery request frame among information on the second device.

To further achieve these and other advantages and in accordance with the purpose of the present invention, according to a second technical aspect, a first device supporting WFD (Wi-Fi Display) includes a reception module and a processor, the processor configured to transmit a discovery request frame including one or more TLV (type length value) fields to an AP (access point), the processor configured to receive a discovery response frame, which is received from a second device received the discovery request frame, including one or more TLV fields via the AP. In this case, the one or more TLV fields included in the discovery request frame includes information on the first device and the one or more TLV fields included in the discovery response frame includes information corresponding to the discovery request frame among information on the second device.

The first technical aspect and the second technical aspect of the present invention can include at least one of the following items.

The discovery request frame can be broadcasted to devices belonging to a subnet by the AP.

The discovery response frame can be unicasted by the second device.

The first device, the second device and the AP may belong to an identical subnet.

Each of the information on the first device and the information on the second device may correspond to one of a WFD IE (Wi-Fi Display Information Element), a WSC IE (Wi-Fi Simple Config Information Element), or a P2P IE (Peer-to-Peer Information Element).

The WFD IE may include a WFD Device Information subelement, an Associated BSSID (Basic Service Set Identity) subelement, a WFD Audio Formats subelement, a WFD Video Formats subelement, a WFD 3D Video Formats subelement, a WFD Content Protection subelement, a Coupled Sink Information subelement, a WFD Extended Capability subelement, a Local IP (Internet Protocol) Address subelement, a WFD Session Information subelement, and an Alternative MAC Address subelement.

A query field included in the discovery request frame can indicate one or more subelements among a plurality of the subelements.

The information on the second device included in the discovery response frame may correspond to a subelement indicated by the query field.

Each of the discovery request frame and the discovery response frame can include an IP header, an UDP (user data protocol) header, and a UDP datagram.

The UDP datagram can include the one or more TLV fields.

The UDP datagram included in the discovery request frame can further include a query field.

The first device may correspond to a WFD source device and the second device may correspond to a WFD sink device.

Advantageous Effects

According to the present invention, it is able to promptly and simply perform a discovery procedure under a previously existing internet protocol connection. And, it is able to use previously defined information elements as it is.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram for explaining a discovery frame according to embodiments of the present invention;

FIGS. 9 to 10 are diagrams for explaining a discovery request frame and a discovery response frame according to embodiments of the present invention;

BEST MODE FOR INVENTION

Figure 1:
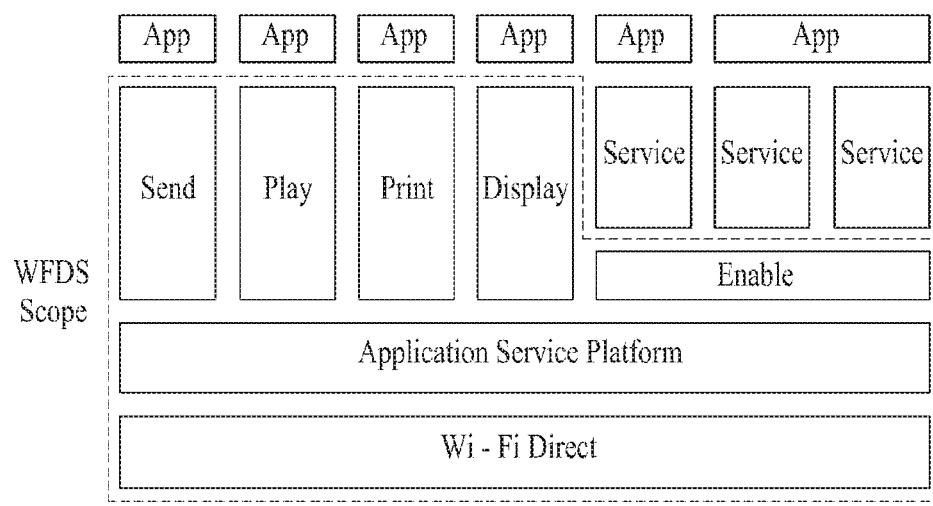
FIG. 1 is a diagram for an exemplary structure of a WFDS system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, the present disclosure focuses on the IEEE 802.11 system. However, the technical features of the present invention are not limited thereto.

Wi-Fi Display

Among WFDS, a display service, i.e., Wi-Fi Display (WFD), corresponds to a service and an application enabling a screen to be shared between P2P devices.

Figure 2:
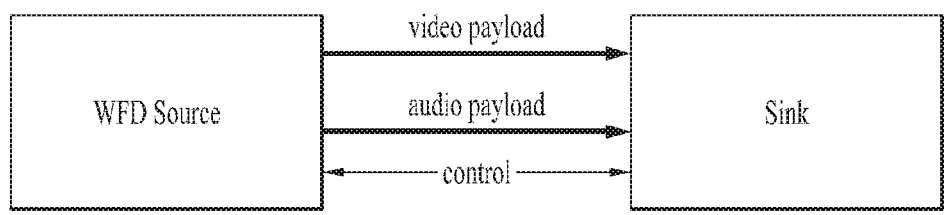
FIG. 2 is a diagram for an example of a WFD connection.

FIG. 2 is a diagram for an example of a WFD connection. In FIG. 2, a WFD source and a WFD sink correspond to WFDS devices and can be connected with each other by P2P. In this case, the WFD source may correspond to a device configured to support streaming of multimedia contents via a P2P link and the WFD sink may correspond to a device configured to receive a data set from the WFD source via the P2P link and perform a procedure of generating an image and/or sound based on the data set (the procedure may be referred to as rendering). The WFD sink can be divided into a primary sink and a secondary sink. In particular, if the secondary sink is independently connected with the WFD source, it may be able to perform rendering on an audio payload only.

Figure 3:
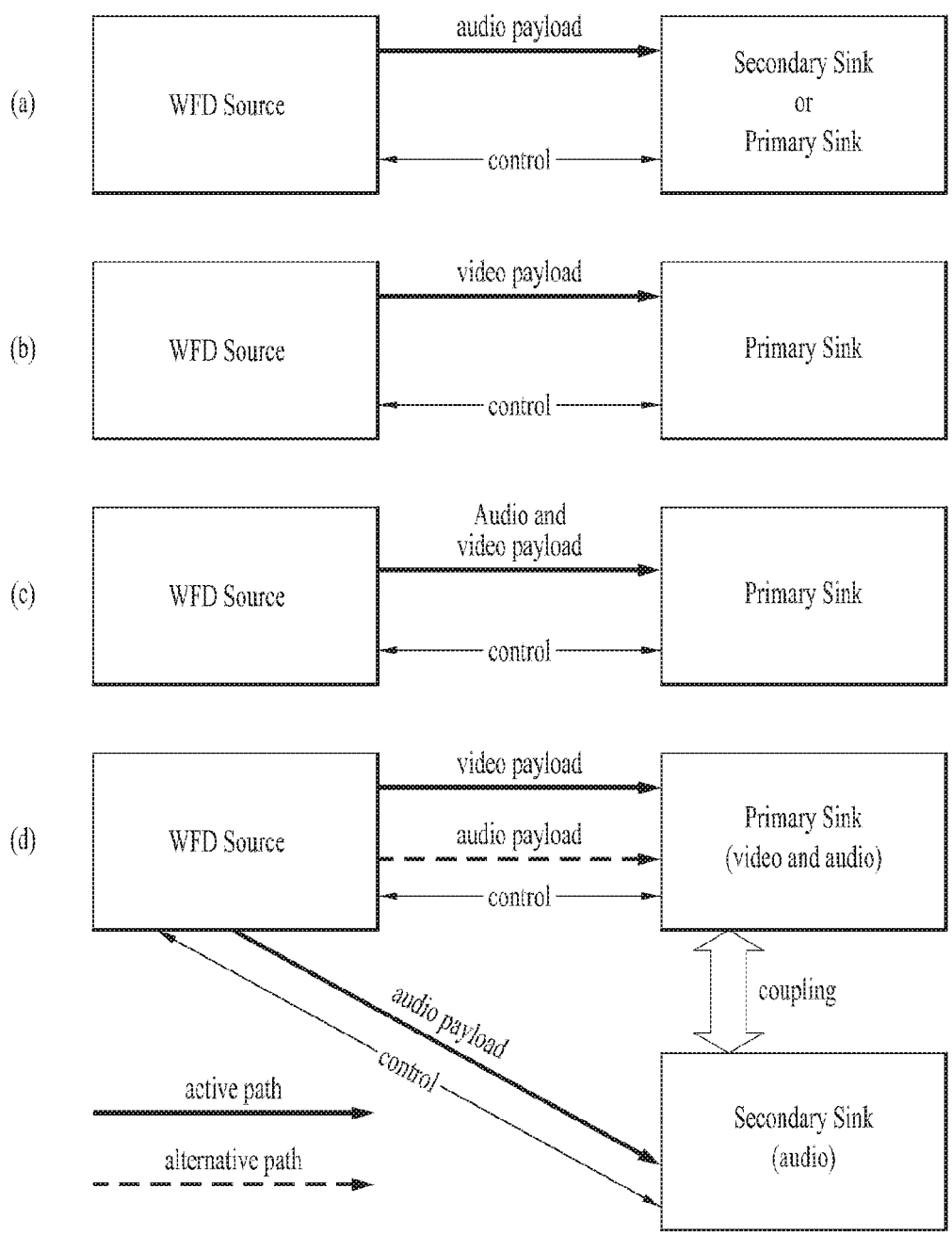
FIG. 3 is a diagram for examples of a WFD session.

FIG. 3 is a diagram for examples of a WFD session. FIG. 3 (a) shows an audio-only session. A WFD source can be connected with either a primary sink or a secondary sink. FIG. 3 (b) shows a video-only session. A WFD source is connected with a primary sink. FIG. 3 (c) shows an audio session and a video session. Similar to the case of FIG. 3 (b), a WFD sink can be connected with a primary sink only. FIG. 3 (d) shows an example of a session connection in case of a coupled sink (coupled WFD sink). In this case, a primary sink and a secondary sink can perform rendering on video and audio, respectively. Alternately, the primary sink can perform rendering on both video and audio.

Figure 4:
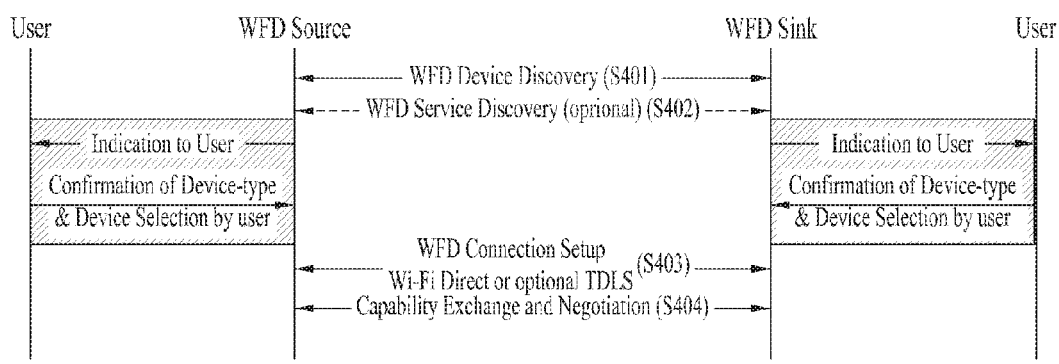
FIG. 4 is a diagram for explaining procedures necessary for establishing a WFD session.

The aforementioned session can be established after procedures shown in FIG. 4 are performed. Specifically, a session can be established after a WFD device discovery procedure S401, a WFD service discovery procedure S402, a WFD connection setup procedure S403, and a capability exchange and negotiation procedure S404 are performed. In the following, the procedures are sequentially explained.

WFD Device Discovery

A WFD source can discover a peer device for WFD, i.e., a WFD sink, via WFD device discovery.

For the WFD device discovery, WFD devices can include a WFD IE (information element) in a beacon, a probe request frame, a probe response frame and the like. In this case, the WFD IE corresponds to an information element including information on WFD such as a device type, a device state and the like. Regarding the WFD IE, it shall be explained later in detail. If a WFD device receives a probe request frame including a WFD IE, the WFD device can transmit a probe response frame including a WFD IE of the WFD device in response to the probe request frame. If the WF device is associated with an infrastructure AP and the WFD device operates as a Wi-Fi P2P device, a WFD IE and a P2P information element can be included in the probe request frame. The probe response frame, which is transmitted in response to the probe request frame, is transmitted via a channel on which the probe request frame is received and the probe response frame can include both a P2P IE and a WFD IE.

Contents related to the WFD device discovery, which are not mentioned in the foregoing description, may follow 'Wi-Fi Display Technical Specification' and/or 'Wi-Fi Peer-to-Peer (P2P) Technical Specification Wi-Fi Direct Service Addendum' document. This can be applied to following description as well.

WFD Service Discovery

Having performed the WFD device discovery, a WFD source and/or a WFD sink can discover a mutual service capability if necessary. Specifically, if one WFD device transmits a service discovery request frame of which WFD capability is included as an information sub-element, another WFD device can transmit a service discovery response frame of which WFD capability of the WFD device is included as an information sub-element in response to the service discovery request frame. In order to perform a service discovery procedure, a probe request frame and a probe response frame, which are used for a device discovery procedure, can include information indicating whether or not a WFD device has capability capable of supporting the service discovery procedure.

WFD Connection Setup

Figure 5:
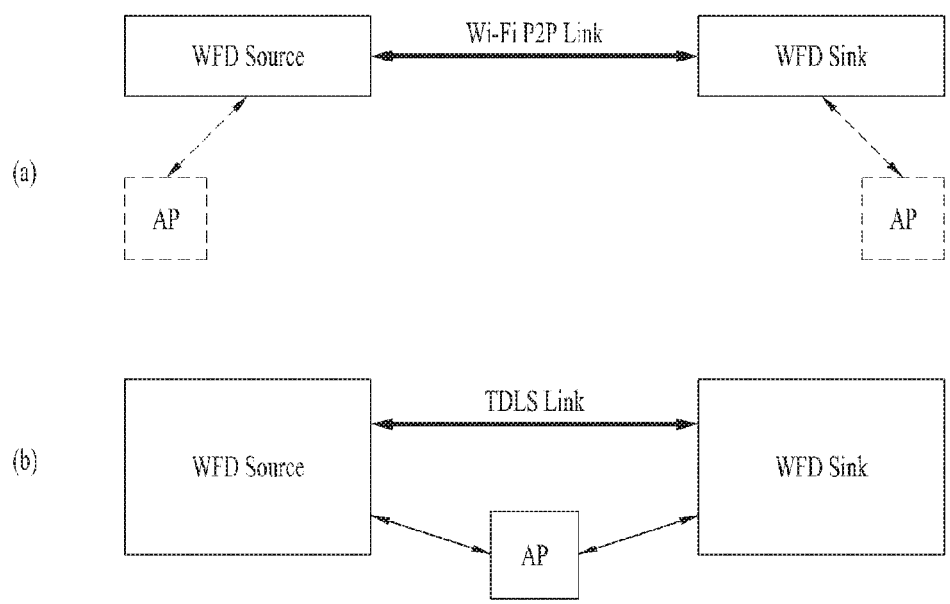
FIG. 5 is a diagram for a WFD connection topology.

Having performed the WFD device discovery procedure and optionally the WFD service discovery procedure, a WFD device can select a WFD device for performing the WFD connection setup procedure. After the WFD device for performing the WFD connection setup procedure is selected according to a policy, a user input, and the like, it may use a connectivity scheme among Wi-Fi P2P and TDLS for a WFD connection. WFD devices can determine a connectivity scheme based on preferred connectivity information and an associated BSSID sub-element which is delivered together with a WFD information element. FIG. 5 (a) and FIG. 5 (b) show a connection using the Wi-Fi P2P connectivity scheme and a connection using TDLS connectivity scheme. In FIG. 5 (a), an AP may be common to a WFD source and a WFD sink or may be different to the WFD source and the WFD sink. Or, the AP may not exist. If a WFD connection is performed using the TDLS, as shown in FIG. 5 (b), the WFD source and the WFD sink should maintain the connection with the AP.

WFD Capability Exchange and Negotiation

Figure 6:
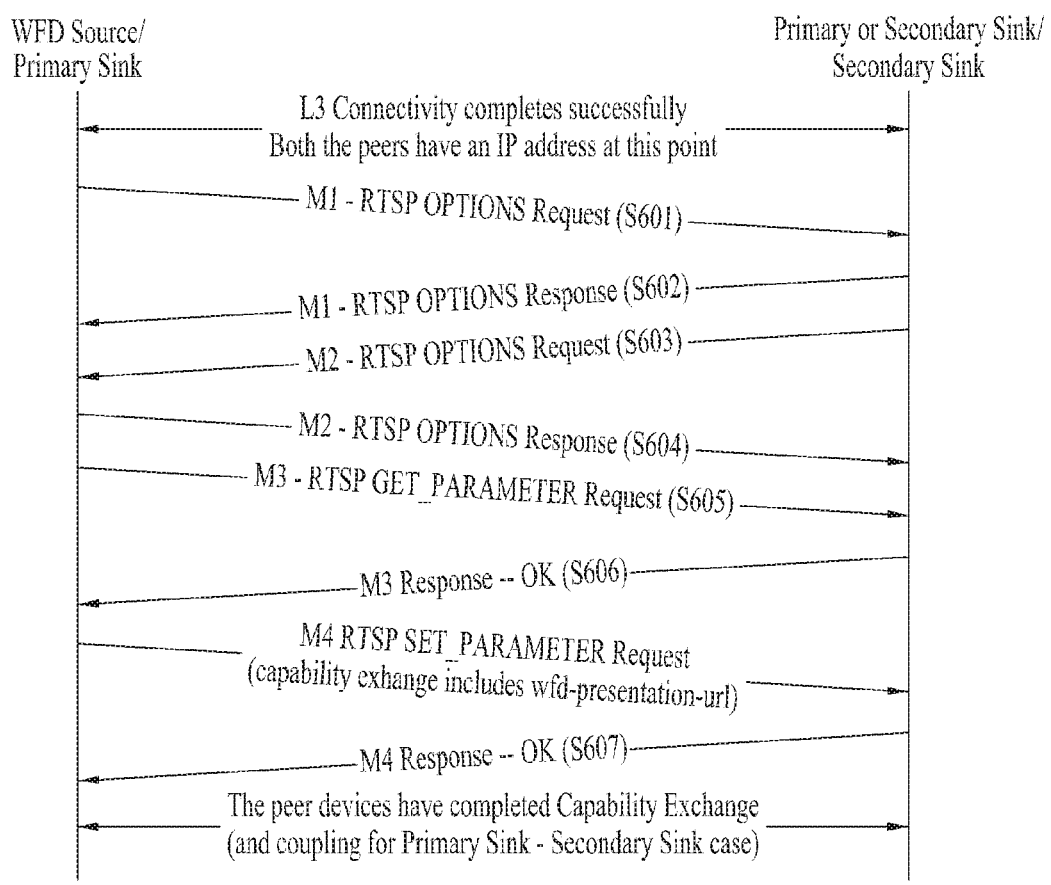
FIG. 6 is a diagram for explaining WFD capability exchange and negotiation.

If the WFD connection setup is performed between WFD devices, a WFD device can perform the WFD capability exchange and negotiation. A WFD source and a WFD sink can deliver at least one selected from the group consisting of information on a codec supported by both the WFD source and the WFD sink, profile information of the codec, level information of the codec and resolution information to the WFD device via the WFD capability negotiation. The WFD capability exchange and negotiation procedure can be performed by exchanging a message using an RTSP (real-time streaming protocol). And, it may be able to determine a parameter set for defining an audio/video payload during a WFD session. As shown in FIG. 6, the WFD capability exchange and negotiation procedure can be performed by exchanging RTSP M1 message to RTSP M4 message.

Specifically, the WFD source can transmit RTSP M1 request message to initiate an RSTP procedure and WFD capability negotiation [S601]. The RTSP M1 message can include an RTSP OPTIONS request for determining an RTSP methods set supported by the WFD sink. Having received the RTSP M1 request message, the WFD sink can transmit an RTSP M1 response message in which RTSP methods supported by the WFD sink are listed [S602].

Subsequently, the WFD sink can transmit an RTSP M2 request message for determining an RTSP method set supported by the WFD source [S603]. Having received the RTSP M2 request message, the WFD source can transmit an RTSP M2 response message in which RTSP methods supported by the WFD source are listed in response to the RTSP M2 request message [S604].

The WFD source can transmit an RTSP M3 request message (RTSP GET_PARAMETER request message) in which a list of WFD capabilities is specified [S605]. Having received the RTSP M3 request message, the WFD sink can transmit an RTSP M3 response message (RTSP GET_PARAMETER response message) in response to the RTSP M3 request message.

The WFD source determines an optimized parameter set to be used for a WFD session based on the RTSP M3 response message and can transmit an RTSP M4 request message (RTSP SET_PARAMETER request message) including the determined parameter set to the WFD sink

[S606]. Having received the RTSP M4 request message, the WFD sink can transmit an RTSP M4 response message (RTSP SET_PARAMETER response message) [S606].

WFD Session Establishment

Figure 7:
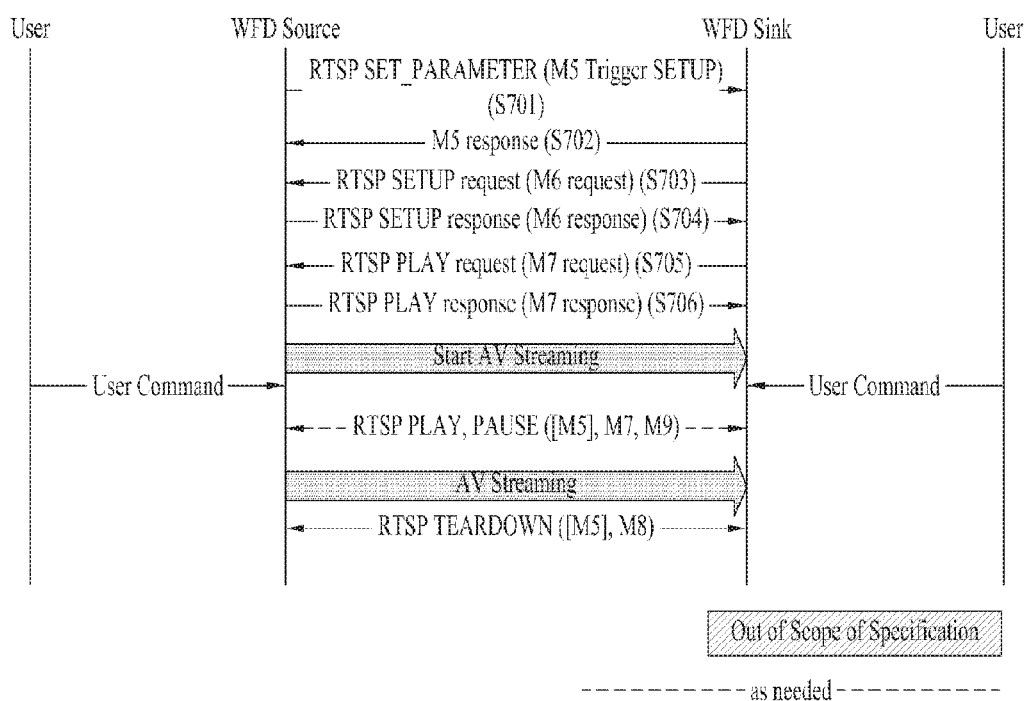
FIG. 7 is a diagram for explaining WFD session establishment.

Having performed the WFD capability exchange and negotiation, the WFD devices can establish a WFD session via procedures shown in FIG. 7. Specifically, the WFD source can transmit an RTSP SET parameter request message (RTSP M5 Trigger SETUP request) to the WFD sink [S701]. The WFD sink can transmit an RTSP M5 response message (RTSP M5 response) to the WFD source in response to the RTSP SET parameter request message.

If the RTSP M5 message including a trigger parameter SETUP is successfully exchanged, the WFD sink can transmit an RTSP SETUP request message (RTSP M6 request) to the WFD source. Having received the RTSP M6 request message, the WFD source can transmit an RTSP SETUP response message to the WFD sink in response to the RTSP M6 request message. If a status code of the RTSP M6 response message indicates 'OK', it may indicate that an RTSP session is successfully established.

After the RTSP M6 message is successfully exchanged, the WFD sink can transmit an RTSP PLAY request message (RTSP M7 request) to the WFD source to indicate that the WFD sink is ready to receive an RTP stream. The WFD source can transmit an RTSP PLAY response message (RTSP M7 response) to the WFD sink in response to the RTSP PLAY request message. In this case, if a status code of the RTSP PLAY response message indicates 'OK', it may indicate that a WFD session is successfully established. After the WFD session is established, the WFD source can transmit an RTSP M3 request message (RTSP GET_PARAMETER request message) for obtaining capability on at least one or more RTSP parameters supported by the WFD sink, an RTSP M4 request message for setting at least one or more RTSP parameter values corresponding to a WFD session to renegotiate capability between the WFD source and the WFD sink to update an AV (audio/video) format, an RTSP M5 request message for triggering the WFD sink to transmit an RTSP PAUSE request message (RTSP M9 request message), an RTSP M12 request message for indicating that the WFD source enters a WFD standby mode, an RTSP M14 request message for selecting an input type to be used in UIBC, an input device and other parameters, an RTSP M15 request message for enabling or disenabling UIBC, and the like to the WFD sink.

Subsequently, the WFD sink can transmit an RTSP M7 request message (RTSP PLAY request message) for initiating (or resuming) audio/video streaming, an RTSP M9 request message (RTSP PAUSE request message) for pausing audio/video streaming to the WFD sink from the WFD source, an RTSP M10 request message for asking the WFD source to change an audio rendering device, an RTSP M11 request message for indicating to change an active connector type, an RTSP M12 request message for indicating that the WFD sink enters a WFD standby mode, an M13 request message for asking the WFD source to refresh IDR, an RTSP M14 request message for selecting an input type to be used in UIBC, an input device and other parameters, an RTSP M15 request message for enabling or disenabling UIBC, and the like to the WFD source. Having received the aforementioned RTSP request message from the WFD sink, the WFD source can transmit an RTSP response message to the WFD sink in response to the RTSP request message.

If a WFD session is established and audio/video streaming is initiated, the WFD source and the WFD sink can perform audio/video streaming using a codec supported by both the WFD source and the WFD sink. Since the codec supported by both the WFD source and the WFD sink is used, it is able to guarantee interoperability between the WFD source and the WFD sink.

WFD Information Element

WFD communication is performed based on WFD IE. A frame format of the WFD IE is shown in Table 1 in the following.

TABLE 1

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI(Organizationally Unique Identifier) |
| OUI Type | 1 | 0A | Identifying the type or version of the WFD IE. Setting to 0x0A indicates WFA WFD v1.0 |
| WFD subelements | Variable | | One or more WFD subelements appear in the WFD IE |

As shown in Table 1, similar to a legacy P2P IE, a WFD IE includes an element ID field, a length field, a WFD-specific OUI field, an OUI type field indicating a type/version of the WFD IE, and a WFD subelement field. The WFD subelement field has a form shown in Table 2 in the following.

TABLE 2

| Field | Size (octets) | Value (Hexadecimal) | Description |
|---|---|---|---|
| Subelement ID | 1 | | Identifying the type of WFD subelement. (For details, refer to Table 3) |
| Length | 2 | Variable | Length of the following fields in the subelement |
| Subelements body field | Variable | | Subelement specific information fields |

TABLE 3

| Subelement ID (Decimal) | Notes |
|---|---|
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

The subelement field of 1 octet indicates information included in the WFD subelement field. Specifically, values 0, 1, . . . 10 included in the subelement field can indicate that each of subelements corresponds to WFD Device Information subelement, Associated BSSID subelement, WFD Audio Formats subelement, WFD Video Formats subelement, WFD 3D Video Formats subelement, WFD Content Protection subelement, Coupled Sink Information subelement, WFD Extended Capability subelement, Local IP Address subelement, WFD Session Information subelement, Alternative MAC Address subelement, respectively. In this case, the WFD Device Information subelement includes informations necessary for determining whether to attempt pairing with a WFD device and session generation. The Associated BSSID subelement is used to indicate an address of a currently associated AP. The WFD Audio Formats subelement, the WFD Video Formats subelement, and the WFD 3D Video Formats subelement are used to indicate capability of a WFD device related to audio, video, and 3D video, respectively. The WFD Content Protection subelement delivers information on a content protection scheme and the Coupled Sink Information subelement delivers information on a status of a coupled sink, MAC address, and the like. The WFD Extended Capability subelement is used to deliver information on various capabilities of other WFD device and the Local IP Address subelement is used to deliver an IP address to a WFD peer in a TDLS setup procedure. The WFD Session Information subelement includes such information as a list of WFD device information descriptions in a WFD group. If a WFD connection scheme requires an interface (e.g., MAC address) different from an interface used in device discovery, the Alternative MAC Address subelement can deliver information on the interface.

Subsequently, the Subelement body field includes detail information of a subelement corresponding to a subelement ID. For example, in case of the WFD Device Information subelement, as shown in Table 4 in the following, the subelement body field can include a WFD Device Information subfield including information on a WFD device, a Session Management Control Port subfield indicating TCP port information for receiving an RTSP message, and a WFD Device Maximum Throughput subfield indicating information on a maximum average throughput.

TABLE 4

| Field | Size (octets) | Value | Description |
| --- | --- | --- | --- |
| Subelement ID | 1 | 0 | Identifying the type of WFD subelement. (For details, refer to Table 3) |
| Length | 2 | 6 | Length of the following fields of the subelement. |
| WFD Device Information | 2 | | Refer to Table 5 |
| Session Management Control Port | 2 | Valid TCP port | Default 7236. TCP port at which the WFD Device listens for RTSP messages. (If a WFD Sink that is transmitting this subelement does not support the RTSP server function, this field is set to all zeros.) The WFD Device can choose any value other than default 7236. |
| WFD Device Maximum Throughput | 2 | | Maximum average throughput capability of the WFD Device represented in multiples of 1 Mbps |

TABLE 5

| Bits | Name | Interpretation |
| --- | --- | --- |
| 1:0 | WFD Device Type bits | 0b00: WFD Source<br>0b01: Primary Sink<br>0b10: Secondary Sink<br>0b11: dual-role possible, i.e., either a WFD Source or a Primary Sink |
| 2 | Coupled Sink Operation Support at WFD Source bit | 0b0: Coupled Sink Operation not supported by WFD Source.<br>0b1: Coupled Sink Operation supported by WFD Source<br>This bit is valid for WFD Device Type bits set to value 0b00 or 0b11. When WFD Device Type bits value is 0b01 or 0b10, the value of this b2 is ignored upon receiving. |
| 3 | Coupled Sink Operation Support at WFD Sink bit | 0b0: Coupled Sink Operation not supported by WFD Sink<br>0b1: Coupled Sink Operation supported by WFD Sink<br>This bit is valid for WFD Device Type bits set to value 0b01, 0b10 or 0b11. When WFD Device Type bits value is 0b00, the value of this b3 is ignored upon receiving. |
| 5:4 | WFD Session Availability bits | 0b00: Not available for WFD Session<br>0b01: Available for WFD Session<br>0b10, 0b11: Reserved |
| 6 | WSD Support bit | 0b0: WFD Service Discovery (WSD): Not supported<br>0b1: WFD Service Discovery (WSD): Supported |
| 7 | PC bit | 0b0: Preferred Connectivity (PC): P2P<br>0b1: Preferred Connectivity (PC): TDLS |
| 8 | CP Support bit | 0b0: Content Protection using the HDCP system 2.0/2.1: Not supported<br>0b1: Content Protection using the HDCP system 2.0/2.1: Supported |
| 9 | Time Synchronization Support bit | 0b0: Time Synchronization using 802.1AS: Not supported<br>0b1: Time Synchronization using 802.1AS: Supported |
| 10 | Audio unsupported at Primary Sink bit | 0b0: all cases except below<br>0b1: If B1B0 = 0b01 or 0b11, and this WFD Device does not support audio rendering when acting as a Primary Sink |
| 11 | Audio only support at WFD Source bit | 0b0: all cases except below<br>0b1: If B1B0 = 0b00 or 0b11, and this WFD Device supports transmitting audio only elementary stream when acting as a WFD Source |

In a WFD topology, a source and a sink can be connected with an identical AP. In particular, a WFD device can be connected with an infrastructure BSS. In this case, it may use device/service discovery or session initiation using a higher layer protocol instead of the aforementioned layer 2 discovery. In the following, a device/service discovery procedure using a higher layer protocol according to embodiments of the present invention is explained.

Embodiment 1

A first embodiment relates to a (device/service) discovery method of a WFD device using a UDP (user datagram protocol).

If a first device, a second device and an AP supporting WFD coexist in an identical subnet, the first device corresponding to a WFD source device can discover a WFD sink device via a broadcast message at the top of IP. In particular, the first device can broadcast a (WFD) discovery request frame to the entire subnet via the AP. Having received the discovery request frame via the AP, the second device can transmit a (WFD) discovery response frame in unicast.

The discovery request frame and the discovery response frame can be transmitted by a UDP discovery protocol. For example, a frame type shown in FIG. 8 (a) can be used. Referring to FIG. 8 (a), a discovery frame according to embodiments of the present invention includes an IP header, a UDP header, and a UDP datagram. The UDP datagram can include an Opcode field, a sequence number field, and a payload field. In this case, an Opcode value indicates a message. For example, the Opcode value can be used as shown in an example of FIG. 8 (b) or 8 (c). As shown in FIG. 9, the payload field can include a version field, a length field and TLV fields. The aforementioned discovery message can be transmitted and received via a single port and each message may correspond to a single UDP datagram. The version field can include version information of a WFD control protocol. The version field may have a size of 1 byte. Upper 4 bits can be configured as a major version and lower 4 bits can be configured as a minor version. For example, in case of WFD 2.0, it can be represented as 0b00100000.

The TLV field can include P2P IE, WFD IE, WSC IE, WFA IE, and the like. Table 6 in the following shows examples of data types included in a TLV.

TABLE 6

| Type | Notes |
| --- | --- |
| 0x0000 | WFD Device Information |
| 0x0001 | Associated BSSID |
| 0x0002 | WFD Audio Formats |
| 0x0003 | WFD Video Formats |
| 0x0004 | WFD 3D Video Formats |
| 0x0005 | WFD Content Protection |
| 0x0006 | Coupled Sink Information |
| 0x0007 | WFD Extended Capability |
| 0x0008 | Local IP Address |
| 0x0009 | WFD Session Information |
| 0x000A | Alternative MAC Address |
| 0x000B | Infrastructure BSS |
| 0x000C | Status |
| 0x000D-0x00FF | Reserved |
| 0x0100 | Status |
| 0x0101 | Minor Reason Code |
| 0x0102 | P2P Capability |
| 0x0103 | P2P Device ID |
| 0x0104 | Group Owner Intent |
| 0x0105 | Configuration Timeout |
| 0x0106 | Listen Channel |
| 0x0107 | P2P Group BSSID |
| 0x0108 | Extended Listen Timing |
| 0x0109 | Intended P2P Interface Address |
| 0x010A | P2P Manageability |
| 0x010B | Channel List |
| 0x010C | Notice of Absence |

TABLE 6-continued

| Type | Notes |
| --- | --- |
| 0x010D | P2P Device Info |
| 0x010E | P2P Group Info |
| 0x010F | P2P Group ID |
| 0x0110 | P2P Interface |
| 0x0111 | Operating Channel |
| 0x0112 | Invitation Flags |
| 0x0113 | Out-of-Band Group Owner Negotiation Channel |
| 0x0114 | Unused |
| 0x0115 | Service Hash |
| 0x0116 | Session Information Data Info |
| 0x0117 | Connection Capability Info |
| 0x0118 | Advertisement_ID Info |
| 0x0119 | Advertised Service Info |
| 0x011A | Session ID Info |
| 0x011B | Feature Capability |
| 0x011C | Persistent Group Info |
| 0x011D-0x01DC | Reserved |
| 0x01DD | Vendor specific attribute |
| 0x01DE-0x01FF | Reserved |
| 0x1062-0xFFFF | Defined in Table 28 in WSC Technical specification |

In Table 4, 0x0000-0x00ff indicates an attribute type included in the WFD IE, 0x0100-0x01ff indicates an attribute type included in the P2P IE, and 0x1000-0xfff indicates an attribute type included in the WSC IE. For details, it may follow WFD Technical specification, P2P Technical specification, and WSC Technical specification.

FIG. 9 shows an example of a discovery request frame. In FIG. 9 (a), one or more IE TLV fields may correspond to an IE defined in the P2P IE, the WFD IE, the WSC IE or other WFA (Wi-Fi Alliance) as information on the first device. For example, IEs included in a discovery request frame may correspond to IEs shown in Table 7 in the following.

TABLE 7

| IE TLV 1 | P2P Capability IE | Information based on P2P IE |
| --- | --- | --- |
| IE TLV 2 | P2P Device ID | (P2P Technical |
| IE TLV 3 | Extended Listen Timing | Specification) |
| IE TLV 4 | Operating Channel | |
| IE TLV 5 | Device Name | Information based on WSC IE |
| IE TLV 6 | Requested Device Type | (WSC Technical Specification) |
| IE TLV 7 | WFD Device Information | Information based on WFD IE |
| IE TLV 8 | Associated BSSID | (WFD Technical |
| IE TLV 9 | Coupled Sink information | Specification) |
| IE TLV 10 | WFD Extended Capability | |
| IE TLV 11 | Local IP Address | |

Yet, Table 4 is just an example. A previously defined P2P IE, WFD IE, and WSC IE can be transmitted as TLVs. For example, the WFD IE may correspond to one selected from the group consisting of a WFD Device Information subelement, an Associated BSSID subelement (or Infrastructure BSS information), a WFD Audio Formats subelement, a WFD Video Formats subelement, a WFD 3D Video Formats subelement, a WFD Content Protection subelement, a Coupled Sink Information subelement, a WFD Extended Capability subelement, a Local IP Address subelement, a WFD Session Information subelement, an Alternative MAC Address subelement. And, the WSC IE may correspond to one selected from the group consisting of a UUID-E, a Manufacturer, a Model Name, a Model Number, a Serial Number, a Primary Device Type, a Device Name, Configuration Methods, and Configuration Methods. The P2P IE may correspond to one selected from the group consisting of P2P Capability, a P2P Device ID, and a Listen channel. In particular, the P2P IE may correspond to one of attributes defined in the P2P technical specification.

FIG. 9 (b) shows a different example of the discovery request frame. A WFD source can configure a destination address of an IP packet by a broadcast address and can use UPD packetization or TCP at the top of an IP. And, it may be able to use a specific (predefined) UDP port. The example shown in FIG. 9 (b) can further include a query field (bitmap of 2 bytes). The query field may designate a TLV to be included in a discovery response frame by a device receiving a discovery request. In other word, the query field indicates information of a counterpart about which a WFD device eagers to know. As a specific example, Table 8 in the following can be defined in advance in relation to values of the query field.

TABLE 8

| Bit | Query |
| --- | --- |
| B0 | WFD Device Information |
| B1 | Associated BSSID |
| B2 | WFD Audio Formats |
| B3 | WFD Video Formats |
| B4 | WFD 3D Video Formats |
| B5 | WFD Content Protection |
| B6 | Coupled Sink Information |
| B7 | WFD Extended Capability |
| B8 | Local IP Address |
| B9 | WFD Session Information |
| B10 | Alternative MAC Address |
| B11 | Infrastructure BSS |
| B12-15 | Reserved; set to 0 |

If a WFD source wants to know WFD device information, WFD audio formats, WFD video formats, and WFD content protection information of a WFD sink, it may be able to transmit a discovery request frame by setting 0, 2, 3 and 5 of a query bit to 1 (0b00000000 00101101). If the WFD sink is able to provide a corresponding function and information, the WFD sink can include corresponding informations in a discovery response frame as TLVs.

FIG. 10 shows an example of a discovery response frame. Referring to FIG. 10 (a) or (b), one or more (IE) TLV fields correspond to information on a second device. The one or more (IE) TLV fields may correspond to one of IEs defined by P2P IE, WFD IE, WSC IE, or other WFA (Wi-Fi Alliance). In particular, the one or more (IE) TLV fields included in a discovery response frame may correspond to information (i.e., information indicated by the query field of the discovery request frame) corresponding to a discovery request frame among the information on the second device. For example, IEs included in the discovery request frame may correspond to IEs shown in Table 9 in the following.

TABLE 9

| IE TLV 1 | P2P Capability | Information based on P2P IE |
| --- | --- | --- |
| IE TLV 2 | Extended Listen Timing | (P2P Technical |
| IE TLV 3 | Notice of Absence | Specification) |
| IE TLV 4 | P2P Device Info | |
| IE TLV 5 | P2P Group Info | |
| IE TLV 6 | WFD Device Information | Information based on WFD IE |
| IE TLV 7 | Associated BSSID | (WFD Technical |
| IE TLV 8 | Coupled Sink information | Specification) |
| IE TLV 9 | WFD Extended Capability | |
| IE TLV 10 | WFD Session Information | |
| IE TLV 11 | Alternative MAC Address | |
| IE TLV 12 | WFD Audio Formats | |
| IE TLV 13 | WFD Video Formats | |
| IE TLV 14 | WFD 3D Video Formats | |
| IE TLV 15 | WFD Content Protection | |
| IE TLV 16 | Local IP Address | |

Table 7 is just an example. A previously defined P2P IE, WFD IE, and WSC IE can be transmitted as TLVs. For example, the WFD IE may correspond to one selected from the group consisting of a WFD Device Information subelement, an Associated BSSID subelement (or Infrastructure BSS information), a WFD Audio Formats subelement, a WFD Video Formats subelement, a WFD 3D Video Formats subelement, a WFD Content Protection subelement, a Coupled Sink Information subelement, a WFD Extended Capability subelement, a Local IP Address subelement, a WFD Session Information subelement, an Alternative MAC Address subelement. And, the WSC IE may correspond to one selected from the group consisting of a version, a Wi-Fi simple configuration, state, a response Type, a UUID-E, a manufacturer, a model Name, a model number, a serial Number, a primary device type, a device name, and Configuration Methods. The P2P IE may correspond to one selected from the group consisting of status, a minor reason code, P2P capability, a P2P device ID, group owner intent, configuration timeout, a listen channel, a P2P group BSSID, extended listen timing, an intended P2P interface address.

Similar to the discovery request frame, if the discovery response frame includes a query field, all values of the query field can be padded by 0.

Figure 11:
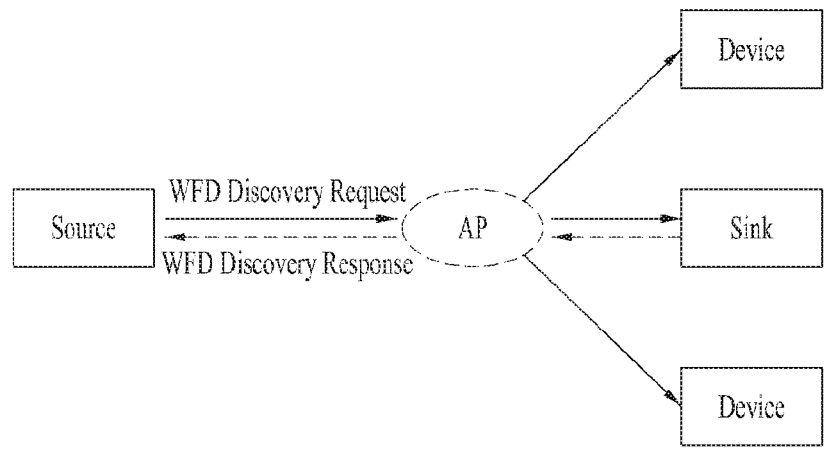
FIG. 11 is a diagram for explaining a discovery procedure according to one embodiment of the present invention.

Based on the aforementioned description, FIG. 11 shows an example of a method of transmitting and receiving a discovery signal according to embodiments of the present invention. Referring to FIG. 11, a WFD source can transmit a discovery request frame including one or more TLV fields to an AP (access point) in broadcast. Subsequently, the first device can receive a discovery response frame including one or more TLV fields from a second device, which has received the discovery request frame, via the AP. In this case, the one or more TLVs included in the discovery request frame include information on the first device. The one or more TLVs included in the discovery response frame can include information corresponding to the discovery request frame among informations on the second device. It may refer to the aforementioned explanation for other details.

Embodiment 2

Figure 12:
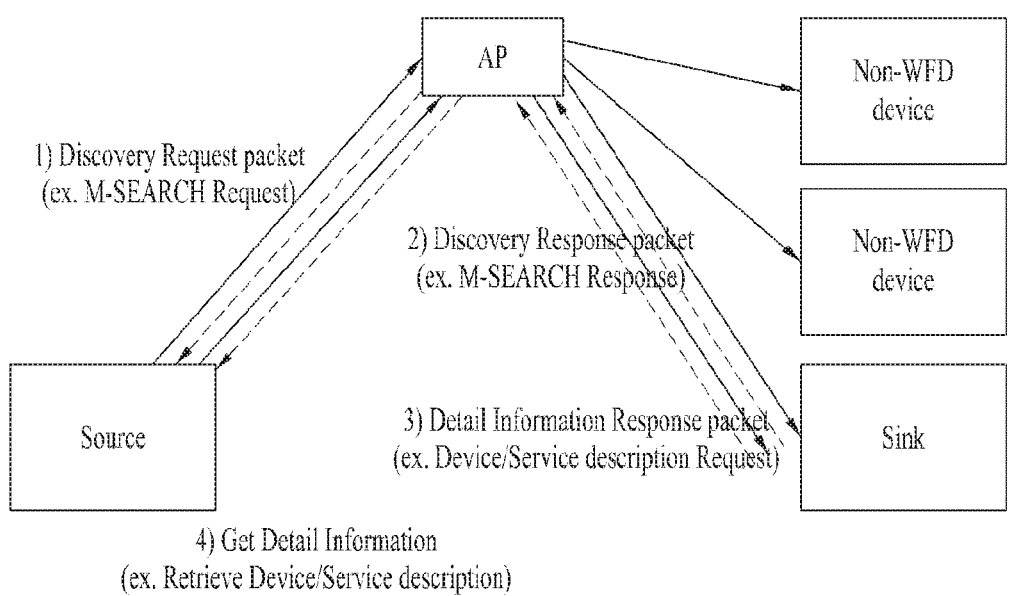
FIG. 12 is a diagram for explaining a discovery procedure according to a different embodiment of the present invention.

Referring to FIG. 12, a first device can broadcast whether or not device/service discovery is available for the entire subnet via a higher layer protocol. For example, in case of using an SSDP (simple service discovery protocol) or UPnP, an M-search message can be transmitted to an AP. A WFD sink can transmit a response to a WFD source in unicast in response to a discovery request message received via the AP. For example, in case of using SSDP/UPnP, the second device can transmit an M-search response to the WFD source. Having received the M-search response, the WFD source can transmit a request to discover detail information on a Miracast service. For example, in case of using SSDO/UPnP, the WFD source makes a request for a device description, interprets the device description and may be then able to obtain the detail information on the service based on the interpreted information.

Table 10 in the following shows an example of a device description when UPnP is used.

TABLE 10

MiracastSinkDeviceDescription.xml

<?xml version=" 1.0" ?>
<root xmlns="urn:schemas-upnp-org:device-1-0" >

TABLE 10-continued

MiracastSinkDeviceDescription.xml

```
        <specVersion>
            <major>1<major>
            <minor>0</minor>
        </specVersion>
        <device>
            <deviceType>urn:xxx:device:MiracastSink:2<deviceType>
            <friendlyName>WFD Device</friendlyName>
            <manufacturer>LG Electronics<manufacturer>
<manufacturerURL>http://www.lge.com</manufacturerURL>
            <modelDescription>LG Device</modelDescription>
            <modelName>LG Device</modelName>
            <modelNumber>1.0<modelNumber>
            <modelURL>http://www.lge.com/</modelURL>
            <serialNumber>123456789001</serialNumber>
    <UDN>uuid:25ef6b90-1dd2-11b2-83fb-93f6021816d8</UDN>
    <serviceList>
    <service>
    <serviceType>urn:xxx:service:MiracastSink:2</serviceType>
    <serviceId>urn:lxxx:serviceId:MiracastSink</serviceId>
    <SCPDURL>/Miracast/scpd.xml<SCPDURL>
            <controlURL>/Miracast/control.xml<controlURL>
            <eventSubURL>/Miracast/event.xml</eventSubURL>
        </service>
    </serviceList>
    </device>
</root>
```

Table 11 in the following shows an example of a service description of a WFD sink. In the example represented by XML, it is able to notify an UPnP action supported by the WFD sink, a port number of a Miracast control protocol (RTSP) and an IP address. The UPnP action can indicate a function capable of initiating a Miracast service via an IP packet (e.g., UPnP action packet).

TABLE 11

MiracastSinkServiceDescription.xml

```
<?xml version="1.0" ?>
    <scpd xmlns="urn:schemas-upnp-org:service-1-0">
        <specVersion>
            <major>1</major>
<minor>0</minor>
</specVersion>
<actionList>
    <action>
        <name>MiracastInit</name>
        <argumentList>
            <argument>
                <name>RTSP_IP_PORT</name>
                <direction>in</direction>
                <relatedStateVariable> X_RTSPSessionURI</
relatedStateVariable>
</argument>
<argument>
            <name>DEVICE_FRIENDLY_NAME</name>
<direction>in</direction>
            relatedStateVariable> X_DeviceFriendlyName</
relatedStateVariable>
</argument>
            </argumentList>
</action>
</actionList>
<serviceStateTable>
<stateVariable sendEvents="no">
        <name>RTSPSessionURI </name>
        <dataType>string</dataType>
</stateVariable>
<stateVariable sendEvents="no">
        <name>DeviceFriendlyName </name>
        <dataType>string</dataType>
</stateVariable>
</seiviceStateTable>
</scpd>
```

Figure 13:
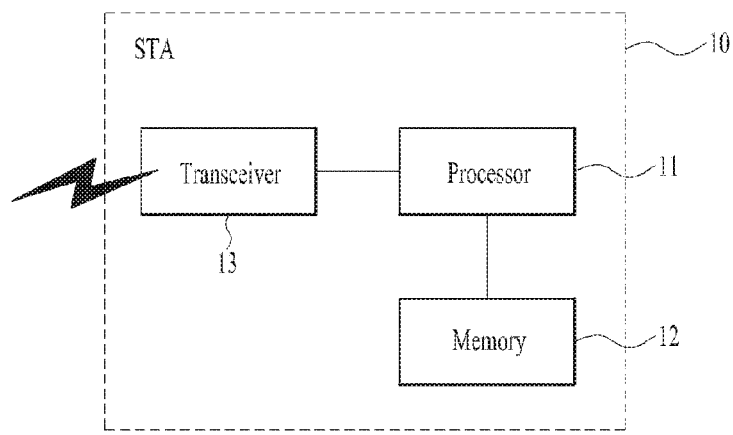
FIGS. 13 to 14 are diagrams for a configuration of a wireless device according to one embodiment of the present invention.

FIG. 13 is a diagram for a configuration of a wireless device according to one embodiment of the present invention.

Referring to FIG. 13, a wireless device 10 may include a processor 11, a memory 12, and a transceiver 13. The transceiver 13 can transmit/receive radio signals and implement a physical layer according to, for example, IEEE 802 system. The processor 11 is connected to the transceiver 13 electrically and can then implement the physical layer and/or a MAC layer according to the IEEE 802 system. Moreover, the processor 11 may be configured to perform at least one operation of the application, the service and the ASP layer according to the various embodiments of the present invention mentioned in the foregoing description. Alternatively, the processor 11 may be configured to perform operations related to a device operating as an AP/STA. Moreover, a module for implementing the operations of the wireless device according to the various embodiments of the present invention mentioned in the foregoing description may be saved in the memory 12 and then driven by the processor 11. The memory 12 may be included inside the processor 11 or be provided outside the processor 11. And, the memory 12 can be connected to the processor 11 through known means.

The detailed configuration of the wireless device 10 in FIG. 13 may be implemented such that each of the various embodiments of the present invention described above is applied independently or at least two thereof are simultaneously applied. And, redundant description shall be omitted for clarity.

Figure 14:
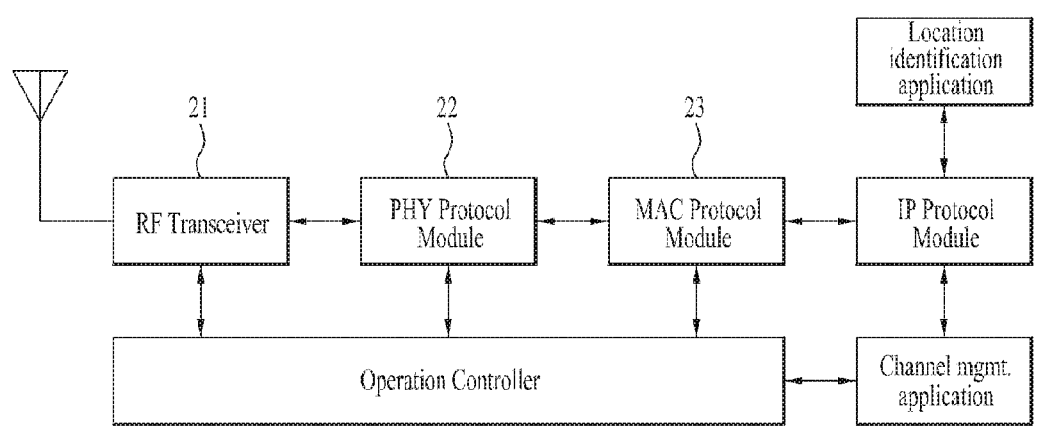

FIG. 14 is a diagram for a different configuration of a wireless device according to one embodiment of the present invention.

Referring to FIG. 14, an RF transceiver 21 moves information generated in a PHY protocol module 22 to an RF spectrum, performs filtering/amplification on the information, and transmit the information to an antenna. And, the RF transceiver moves an RF signal received from an antenna to a band capable of processing the RF signal by the PHY protocol module and performs a function of processing such a procedure as filtering and the like on the RF signal. The RF transceiver can further include a switching function for switching a receiving function and a transmitting function.

The PHY protocol module 22 performs such a processing as FEC encoding, modulating, and inserting an additional signal such as a preamble, a pilot signal and the like on a data required by a MAC protocol module 23 and delivers the data to the RF transceiver. At the same time, the PHY protocol module performs such a processing as demodulating, equalizing, FEC decoding, eliminating a signal added in a PHY layer, and the like on a signal received from the RF transceiver and delivers the data to the MAC protocol module. To this end, a modulator, a demodulator, an equalizer, a FEC encoder, a FEC decoder and the like can be included in the PHY protocol module.

In order to deliver or transmit data delivered from a higher layer to the PHY protocol module, the MAC protocol module 23 performs a necessary procedure or performs additional transmission to implement basic communication. To this end, the MAC protocol module processes data required by the higher layer to be appropriate for transmission and delivers or transmits the processed data to the PHY protocol module. And, the MAC protocol module processes data received from the PHY protocol module and delivers the processed data to the higher layer. The MAC protocol module also plays a role in processing a communication protocol by performing additional transmission and reception necessary for the data delivery.

The embodiments of the present invention mentioned in the foregoing description can be implemented using various means. For instance, the embodiments of the present invention can be implemented using hardware, firmware, software and/or any combinations thereof.

In case of the implementation by hardware, a method according to the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to the embodiments of the present invention can be implemented by modules, procedures, and/or functions for performing the above-explained functions or operations. Software code is stored in the memory unit and can be driven by the processor. The memory unit is provided within or outside the processor to exchange data with the processor through the various means known to the public.

As mentioned in the foregoing description, the detailed descriptions for the preferred embodiments of the present invention are provided to enable those skilled in the art to implement and practice the invention. While the present invention has been described herein with reference to the preferred embodiments thereof, it will be apparent to those skilled in the art that various modifications and variations can be made therein without departing from the spirit and scope of the invention. Therefore, the present invention is not limited to the embodiments disclosed herein but intends to give a broadest scope that matches the principles and new features disclosed herein.

INDUSTRIAL APPLICABILITY

While the above-described various embodiments of the present invention have been described in the context of the IEEE 802.11 system, they are applicable to various mobile communication systems in the same manner.

What is claimed is:

1. A method of performing discovery by a first device supporting WFD (Wi-Fi Display), the method performed by the first device and comprising:
transmitting a discovery request frame to an AP (access point) based on a UDP discovery protocol using a predetermined UDP port, the discovery request frame comprising an IP (Internet Protocol) header, a UDP (User Datagram Protocol) header, and a single UDP datagram including one or more TLV (type length value) fields that comprise information related to the first device; and
receiving a discovery response frame from the AP based on the UDP discovery protocol using the predetermined UDP port, the discovery response frame comprising an IP header, a UDP header, and a single UDP datagram including one or more TLV fields,
wherein the one or more TVL fields in the discovery response frame comprise information related to a second device and corresponding to the discovery request frame, and
wherein the discovery response frame is unicast by configuring a destination address of the IP header in the discovery response frame as an address of the first device.

2. The method of claim 1, wherein the discovery request is broadcast by the AP to devices belonging to a subnet to which the first device belongs by configuring a destination address of the IP header included in the discovery request frame as a broadcast address.

3. The method of claim 1, wherein the information related to the first device and the information related to the second device each corresponds to a WFD IE (Wi-Fi Display Information Element), a WSC IE (Wi-Fi Simple Config Information Element) or a P2P IE (Peer-to-Peer Information Element).

4. The method of claim 3, wherein the WFD IE comprises at least a WFD Device Information sub-element, an Associated BSSID (Basic Service Set Identity) sub-element, a WFD Audio Formats sub-element, a WFD Video Formats sub-element, a WFD 3D Video Formats sub-element, a WFD Content Protection sub-element, a Coupled Sink Information sub-element, a WFD Extended Capability sub-element, a Local IP Address sub-element, a WFD Session Information sub-element, or an Alternative MAC (Medium Access Control) Address sub-element.

5. The method of claim 4, wherein the discovery request frame further comprises a query field indicating one or more of the sub-elements of the WFD IE.

6. The method of claim 5, wherein all the information related to the second device in the received discovery response frame corresponds to a sub-element indicated by the query field.

7. The method of claim 1, wherein the UDP datagram in the transmitted discovery request frame further includes a query field.

8. The method of claim 1, wherein the first device corresponds to a WFD source device and the second device corresponds to a WFD sink device.

9. A first device supporting WFD (Wi-Fi Display), the first device comprising:
a transceiver configured to transmit and receive signals; and
a processor
configured to:
control the transceiver to transmit a discovery request frame to an AP (access point) based on a UDP discovery protocol using a predetermined UDP port, the discovery request frame comprising an IP (Internet Protocol) header, a UDP (User Datagram Protocol) header, and a single UDP datagram including one or more TLV (type length value) fields that comprise information related to the first device; and
control the transceiver to receive a discovery response frame from the AP based on the UDP discovery protocol using the predetermined UDP port, the discovery response frame comprising an IP header, a UDP header, and a single UDP datagram containing one or more TLV fields,
wherein the one or more TVL fields in the discovery response frame comprise information related to a second device and corresponding to the discovery request frame, and
wherein the discovery response frame is unicast by configuring a destination address of the IP header in the discovery response frame as an address of the first device.

10. The device of claim 9, wherein the discovery request is broadcast by the AP to devices belonging to a subnet to which the first device belongs by configuring a destination address of the IP header included in the discovery request frame as a broadcast address.

11. The device of claim 9, wherein the information related to the first device and the information related to the second device each corresponds to a WFD IE (Wi-Fi Display Information Element), a WSC IE (Wi-Fi Simple Config Information Element) or a P2P IE (Peer-to-Peer Information Element).

12. The device of claim 11, wherein the WFD IE comprises at least a WFD Device Information sub-element, an Associated BSSID (Basic Service Set Identity) sub-element, a WFD Audio Formats sub-element, a WFD Video Formats sub-element, a WFD 3D Video Formats sub-element, a WFD Content Protection sub-element, a Coupled Sink Information sub-element, a WFD Extended Capability sub-element, a Local IP Address sub-element, a WFD Session Information sub-element, or an Alternative MAC (Medium Access Control) Address sub-element.

13. The device of claim 12, wherein the discovery request frame further comprises a query field indicating one or more of the sub-elements of the WFD IE.

14. The device of claim 13, wherein all the information related to the second device in the received discovery response frame corresponds to a sub-element indicated by the query field.

15. The device of claim 9, wherein the UDP datagram in the transmitted discovery request frame further includes a query field.

16. The device of claim 9, wherein the first device corresponds to a WFD source device and the second device corresponds to a WFD sink device.

* * * * *